(12) United States Patent
Colby et al.

(10) Patent No.: US 6,403,028 B1
(45) Date of Patent: Jun. 11, 2002

(54) ALL-ORGANIC CORROSION INHIBITOR COMPOSITION AND USES THEREOF

(75) Inventors: Steven J. Colby, New Providence; Dwight E. Emerich, Lincoln Park, both of NJ (US); Edward S. Beardwood, Aurora (CA)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 09/419,524

(22) Filed: Oct. 18, 1999

(51) Int. Cl.$^7$ .............................. C23F 15/00; C02F 5/14
(52) U.S. Cl. ...................... 422/15; 422/17; 252/389.21; 252/180; 252/390
(58) Field of Search ..................... 422/15, 17; 252/180, 252/389.21, 390

(56) References Cited

U.S. PATENT DOCUMENTS

| | | | |
|---|---|---|---|
| 4,432,879 A | 2/1984 | Greaves et al. | ............. 210/699 |
| 5,078,879 A | 1/1992 | Gill et al. | .................... 210/699 |
| 5,300,247 A * | 4/1994 | Emerich et al. | ........... 422/17 X |
| 5,386,038 A | 1/1995 | Davis et al. | ................. 549/262 |
| 6,207,079 B1 * | 3/2001 | Kmec et al. | ............. 252/389.2 |

* cited by examiner

*Primary Examiner*—Elizabeth McKane
(74) *Attorney, Agent, or Firm*—David L. Hedden

(57) ABSTRACT

This invention relates to an all-organic corrosion inhibiting composition comprising (a) 6,6,6-(1,3,5-triazine-2,4,6-triyltriimino) tris hexanoic acid; and (b) a water-soluble phosphonated oligomer salt. The invention also relates to a process for inhibiting corrosion in a closed recirculating cooling water system.

9 Claims, No Drawings

US 6,403,028 B1

ALL-ORGANIC CORROSION INHIBITOR COMPOSITION AND USES THEREOF

FIELD OF THE INVENTION

This invention relates to an all-organic corrosion inhibiting composition comprising (a) 6,6',6"-(1,3,5-triazine-2,4,6-triyltriimino) tris hexanoic acid; and (b) a water-soluble phosphonated oligomer salt. The invention also relates to a process for inhibiting corrosion in a closed recirculating cooling water system.

BACKGROUND OF THE INVENTION

Chemicals are added to recirculating closed and semi-closed cooling water systems, e.g. hot water boilers, chilled water systems, sweet water, free cooling tempered water, process condensate waer, desalter water, geothermal brine, lithium bromide refrigerant brines, automotive engine coolant jacket systems, water pumps and engine jackets, etc. to prevent the corrosion of metal surfaces, particularly corrosion of steel, brass, aluminum, and copper, that are in contact with water. A closed system recirculates water without evaporative cooling and usually has a low level of water loss.

For years, inorganic chemicals, such as heavy metals (chromate and molybdate) or nitrite containing corrosion inhibitors, were typically used in closed systems. When chromate was banned from use in many recirculating cooling water systems and regulations were enacted restricting the discharge of other inorganic chemicals, interest developed in using corrosion inhibitor formulations containing only organic chemicals for closed cooling water systems.

One of the widely used closed system organic corrosion inhibitors is 6,6,6-(1,3,5-triazine-2,4,6-triyltriimino) tris hexanoic acid which is available from FMC Corporation under the trademark "BELCOR 590". BELCOR 590 is a 49% solids wet cake of 6,6,6-(1,3,5-triazine-2,4,6-triyltriimino) tris hexanoic acid. It is known to use BELCOR 590 as a corrosion inhibitor in formulations for closed recirculating cooling water systems.

U.S. Pat. No. 5,386,038 discloses that a mixture of water-soluble phosphonated oligomer salts is effective as corrosion inhibitors in formulations for both open and closed recirculating cooling water systems. BRICORR 288, available from Albright & Wilson, is a 40% solids mixture of water-soluble phosphonated oligomer salts.

Although many organic formulations were developed to inhibit the corrosion of metals in recirculating cooling water systems, these formulations were more expensive than the inorganic formulations they replaced. In order to make these all-organic formulations cost competitive, formulators search for blends which are synergistic. Organic synergistic blends can compete with inorganic corrosion inhibitors because they are effective at significantly lower dosages. The prior art does not disclose blends of 6,6,6-(1,3,5-triazine-2,4,6-triyltriimino) tris hexanoic acid and water soluble phosphonated oligomer salts to inhibit the corrosion of metal exposed to closed recirculating aqueous systems.

SUMMARY OF THE INVENTION

This invention relates to all-organic corrosion inhibiting compositions comprising:
(a) 6,6',6"-(1,3,5-triazine-2,4,6-triyltriimino) tris hexanoic acid; and
(b) water-soluble phosphonated oligomer salts.

The invention also relates to a process for inhibiting corrosion in a closed recirculating cooling water system. The corrosion inhibiting compositions are particularly effective at inhibiting the corrosion of metal surfaces made of mild steel where steel is found alone in the components of the cooling system, or where there are components present made of other metals, such as brass, copper, aluminum, and or alloys. The blends are synergistic because they inhibit corrosion to a greater extent than was expected in view of the corrosion inhibition activity of the individual components. Because the blends exhibit synergism, they are more cost effective. The compositions are environmentally desirable because they are relatively non-toxic, contain no heavy metals, and have low or no phosphorus. The compositions may also contain an azole compound and/or a water-soluble, anionic polymeric dispersant, silicates, and other components known in the art for use in corrosion inhibiting compositions.

BEST MODE AND OTHER MODES

Component (a) of the corrosion inhibitor composition is 6,6', 6"-(1,3,5-triazine-2,4,6-triyltriimino) tris hexanoic acid. A commercially available product containing this component is BELCOR 590 sold by FMC as a 49% solids wet cake.

Component (b) of the corrosion inhibitor composition is a water-soluble phosphonated oligomer salt, preferably a sodium salt, and typically found as a mixture of oligomers. These oligomers are described in U.S. Pat. No. 5,386,038 which is incorporated by reference. The general structural formula for these water-soluble phosphonated oligomer salts is:

H[CHRCHR]$_n$—PO$_3$M$_2$ wherein at least one R group in each unit is a COOM, CH$_2$OH, phosphono, sulphono, or sulphato group. The other R group, which may be the same as or different from the first R group, is hydrogen or a COOM, hydroxyl, phosphono, sulphono, sulphato, C$_{1-7}$alkyl, carboxylate, hydroxyl C$_{1-7}$alkyl, or a C$_{1-7}$alkenyl group. M is a cation such that the phosphonated oligomer is water soluble and n is 1 to 6, preferably >1 and <6.

Preferably used as the water-soluble phosphonated oligomer salt are salts having the following specific version of the above general structural formula:

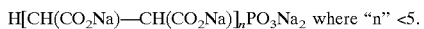
H[CH(CO$_2$Na)—CH(CO$_2$Na)]$_n$PO$_3$Na$_2$ where "n" <5.

The weight ratio of active 6,6,6-(1,3,5-triazine-2,4,6-triyltriimino) tris hexanoic acid to active phosphonated oligomer is from 9:1 to 1:9, preferably from 4:1 to 1:1. It has been found that a synergy exists between the 6,6,6-(1,3,5-triazine-2,4,6-triyltriimino) tris hexanoic acid and the water-soluble phosphonated oligomer salts if used in these amounts in a closed recirculating cooling water system.

Azoles can also be used in the corrosion inhibiting compositions to improve corrosion inhibition for copper and copper alloys. Examples of azoles that can be used in the corrosion inhibiting compositions include thiazoles and triazoles, for instance mercaptobenzothiazole, tolyltriazole, benzotriazole and 5-methylbenzotriazole. Active azole levels in the corrosion inhibitor systems range from 0.1 to 15 parts, preferably from 2 to 3 parts by weight of azole, based upon the total weight of the composition.

It may also be useful to use water soluble, low molecular weight, anionic polymeric dispersants when treating waters that contain high levels of impurities such as hardness salts (calcium carbonate, calcium phosphate) or suspended solids (iron or corrosion products). Examples of water soluble, low molecular weight, anionic polymeric dispersants that can be used in the corrosion inhibiting compositions include, but are not limited to, polyacrylates, acrylic acid copolymers, polymethacrylates, polymaleic anhydrides, maleic anhydride copolymers and sulfonated polymers and copolymers with molecular weights typically ranging from 500 to 20,000. These water soluble, low molecular weight, anionic polymeric dispersants exhibit deposit control efficacy using general dispersancy for suspended solids and corrosion products as well as sequestration, crystal lattice distortion and threshold inhibition for mineral scale deposits. The addition of a polymeric dispersant to the formulation is optional and may be unnecessary in waters with low levels of impurities. The water-soluble, low molecular weight, anionic polymeric dispersants are used in the corrosion inhibitor systems in the amount of 0.1 to 5 parts, preferably from 0.4 to 0.6 parts by weight of polymer, based upon the total weight of the composition.

A preferred closed recirculating cooling water corrosion inhibitor formulation of the present invention includes BELCOR 590 and BRICORR 288 at an actives ratio from 1:9 to 9:1 with total active BELCOR 590/BRICORR 288 solids in the formulation ranging from 1 to 25 parts, an azole compound with total active solids in the formulation ranging from 0.1 to 15 parts and a water soluble, a low molecular weight, anionic polymeric dispersant for mineral scale, and corrosion products dispersancy with total active solids in the formulation ranging from 0.1 to 5 parts, by weight based upon the total weight of the composition. These formulations are used in amounts of 100 to 10,000 ppm as product in cooling water systems, preferably in amounts of 500 to 5000 ppm.

A particularly preferred closed recirculating cooling water corrosion inhibitor composition is a blend of BELCOR 590 and BRICORR 288 at an actives ratio of 2:1 with total active BELCOR 590/BRICORR 288 solids of 5 to 6 parts, tolyltriazole at 2 to 3 parts and a water soluble, low molecular weight, anionic polymeric dispersant at 0.4 to 0.6 parts, by weight based upon the total weight of the composition. Preferably, the composition is used in amount of 1000 to 2000 ppm as product in cooling water systems.

The components of the corrosion inhibitor are typically formulated by mixing them in the following sequence: water, Belcor 590, BRICORR 288, azole, water soluble, low molecular weight, anionic polymeric dispersant. Sodium hydroxide can also be added to improve stability by elevating pH.

ABBREVIATIONS

The following are the abbreviations used in the examples:

BELCOR is BELCOR 590 is a 49% solids wet cake of 6, 6', 6"-(1,3,5-triazine-2,4,6-triyltriimino) tris hexanoic acid, manufactured by FMC.

BRICORR is BRICORR 288, a 40% solids aqueous mixture of water-soluble phosphonated oligomer salts, manufactured by Albright & Wilson Inc.

MPY corrosion rate in "Mils Per Year" or 0.001 inches per year.

EXAMPLES

The examples illustrate specific embodiments of the invention. They are not presented to limit the application of this invention. It is contemplated that other embodiments will be useful. The water used in the examples is described in TABLE I.

TABLE I (Test Water)

| Water components | Concentration |
|---|---|
| Calcium as $CaCO_3$ | 80 ppm |
| Magnesium as $CaCO_3$ | 50 ppm |
| Total Alkalinity as $CaCO_3$ | 130 ppm |
| Chlorides as Cl | 30 ppm |
| Sulfates as $SO_4$ | 20 ppm |
| Silicate as $SiO_2$ | 20 ppm |

Examples 1–2

Corrosion coupons are suspended in 7.5 Liter baths of test water at 50° C. containing 1000 ppm dosage of corrosion inhibitor systems consisting of 5.6 parts active blend of BELCOR 590 and BRICORR 288 at ratios of 1:0, 3:1, 1:1, 1:3 and 0:1; 2.6 parts active tolyltriazole; and 0.5 parts active acrylic acid copolymer with sulfonic functionality, where said parts are based upon the total weight of the composition.

The coupons are continuously mechanically rotated over a 7-day period. Then the coupons are removed, cleaned and weighed to determine corrosion rates in mils per year (mpy) as weight loss. The results of this test are set forth in TABLE II.

TABLE II

| | CORROSION TEST DATA | |
|---|---|---|
| EXAMPLE | BELCOR 590/BRICORR 288 ACTIVE WEIGHT RATIO | C1010 MILD STEEL |
| Comparison A | 1:0 | 3.27 mpy |
| 1 | 3:1 | 0.93 mpy |
| 2 | 1:1 | 1.86 mpy |
| Comparison B | 1:3 | 3.50 mpy |
| Comparison C | 0:1 | 11.02 mpy |

The data show that BRICORR 288 is a weak and insufficient corrosion inhibitor when used alone. Although BELCOR 590 is more effective, it still is not adequate when used alone. However, blends of BELCOR 590 and BRICORR 288 show an unexpected ability to reduce corrosion, particularly if the BELCOR 590 is used in at least a 1:1 ratio.

Examples 3–5

ILLUSTRATE OTHER RATIOS

Examples 3–5 show other ratios of BELCOR 590 to BRICORR 288 and their effect on the corrosion of mild steel. Example 1 (same dosage) was repeated with corrosion inhibitor systems containing 5.6 parts active blend of BELCOR 590 and BRICORR 288 at ratios of 4:1, 3:1, and 2:1, 2.6 parts active tolyltriazole; and 0.5 parts active acrylic acid copolymer with sulfonic functionality, where said parts are based upon the total weight of the composition. The test water in Example 2 contained slightly elevated chlorine levels compared to the water is examples 1 and 3, but was otherwise identical. The results of these experiments are set forth in Table III.

TABLE III

(VARIOUS RATIOS OF BELCOR 590 AND BRICORR 288)

| Example | BELCOR 390/BRICORR 288 WEIGHT RATIO | C1010 Mild Steel |
|---|---|---|
| 3 | 4:1 | 3.18 mpy |
| 4 | 3:1 | 2.41 mpy |
| 5 | 2:1 | 1.61 mpy |

The data in Table III show that 4:1, 3:1, and 2:1 ratios of BELCOR 590:BRICORR 288 are also effective at reducing mild steel corrosion. A 2:1 ratio of BELCOR 590:BRICORR 288 provides better corrosion inhibition than ratios of either 3:1 or 4:1. This data in combination with that in example 3–5 point to a 2:1 ratio providing optimum mild steel corrosion inhibition.

Examples 6–10

ILLUSTRATE THE EFFECT OF DOSAGE

Example 1 was repeated at dosage ranges between 1000 ppm to 2000 ppm using the 2:1 ratio BELCOR 590/BRICORR 288 corrosion inhibitor system used in Example 5. The results of this dosage study are set forth in Table IV.

TABLE IV

(DOSAGE EFFECT OF CORROSION INHIBITOR)

| Example | Dosage | C1010 Mild Steel |
|---|---|---|
| 6 | 1000 ppm | 0.94 mpy |
| 7 | 1250 ppm | 0.76 mpy |
| 8 | 1500 ppm | 0.65 mpy |
| 9 | 1750 ppm | 0.56 mpy |
| 10 | 2000 ppm | 0.52 mpy |

The data in Table IV show that, as the dosage of the corrosion inhibitor increases, the degree of corrosion on the mild steel coupon decreases.

We claim:

1. A corrosion inhibiting composition comprising:
   (a) 6,6',6"-(1,3,5-triazine-2,4,6-triyltriimino) tris hexanoic acid; and
   (b) a water-soluble phosphonate oligomer salt having the general formula:

$H[CHRCHR]_n-PO_3M_2$ wherein at least one R group in each unit is selected from the group consisting of COOM, CH$_2$OH, phosphono, sulphono, and sulphato groups; and the other R group, which may be the same as or different from the first R group, is selected from the group consisting of hydrogen, COOM, hydroxyl, phosphono, sulphono, sulphato, C$_{1-7}$alkyl, carboxylate, hydroxyl C$_{1-7}$alkyl, and C$_{1-7}$alkenyl groups; each M is a cation such that the phosphonated oligomer salt is water-soluble; and n is from 1 to 6, wherein the weight ratio of (a) to (b) is from 1:9 to 9:1.

2. The composition of claim 1 wherein the weight ratio of 6,6,6-(1,3,5-triazine-2,4,6-triyltriimino) tris hexanoic acid to phosphonated oligomer is from 4:1 to 1:1.

3. The composition of claim 2 wherein the solids content of (a) plus (b) is from 1 to 25 parts by weight based upon the total weight of the composition.

4. The composition of claim 3 which further comprises an azole compound selected from the group consisting of thiazoles and triazoles having 0.1 to 15 parts by weight of azole based upon the total weight of the composition.

5. The composition of claim 3 or 4 which further comprises an anionic polymeric dispersant having 0.1 to 5 parts by weight of polymer based upon the total weight of the composition.

6. A process for inhibiting the corrosion of a metal exposed to the water of a closed recirculating cooling water system comprising:

introducing the composition of claims 1, 2, 3, 4, or 5, into aqueous recirculating system in an amount effective to inhibit corrosion and/or scale.

7. The method of claim 6 wherein said composition is used in concentrations of from about 100 ppm to about 10,000 ppm.

8. The method of claim 7 wherein said composition is used in concentrations of from about 500 ppm to about 5000 ppm.

9. The process of claim 8 wherein steel is present as one or more of the metals protected from corrosion.

* * * * *